UNITED STATES PATENT OFFICE.

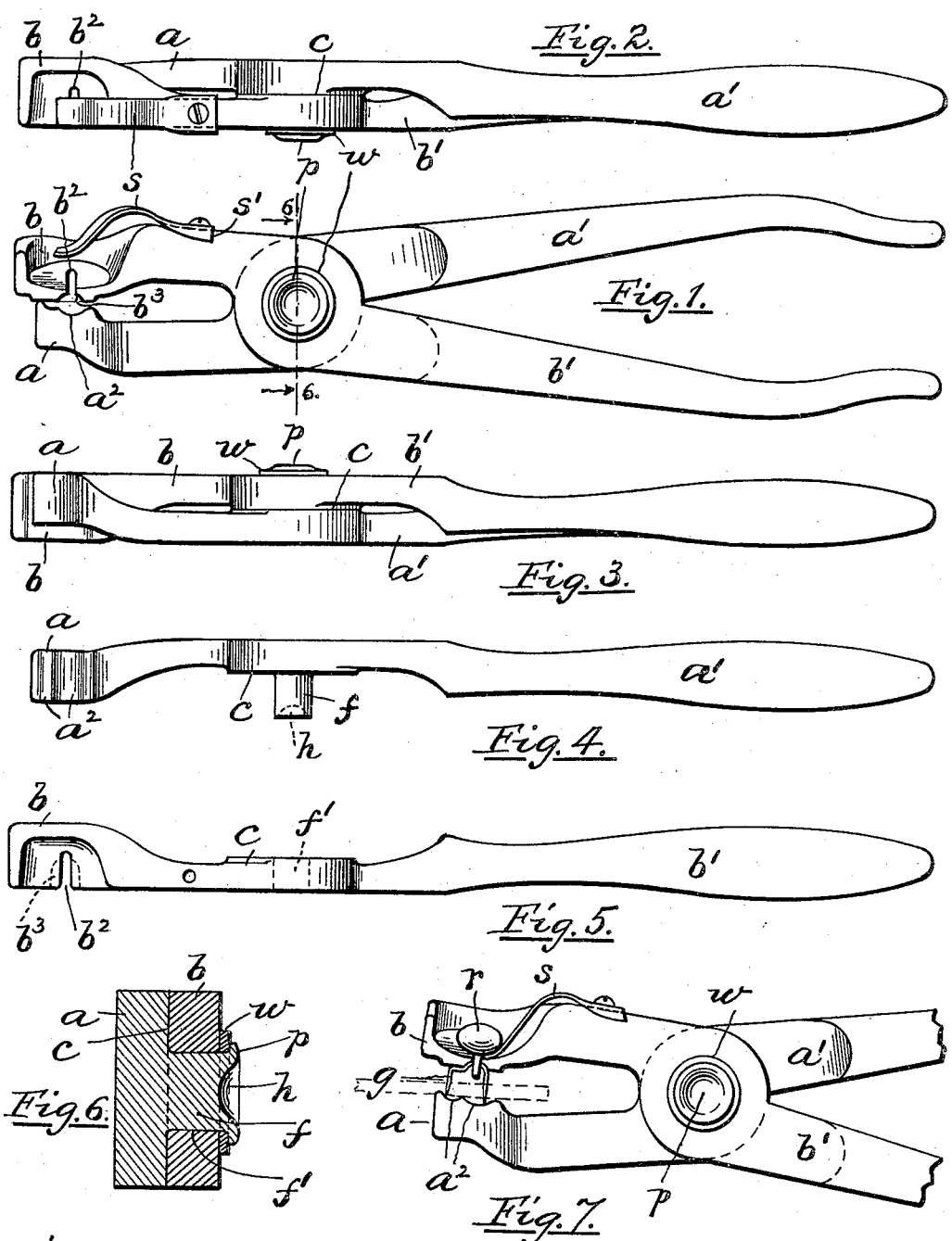

JAMES F. THAYER, OF PROVIDENCE, RHODE ISLAND, ASSIGNOR, BY MESNE ASSIGNMENTS, TO HEATON-PENINSULAR BUTTON FASTENER COMPANY, OF BOSTON, MASSACHUSETTS, A CORPORATION OF MAINE.

BUTTON-SETTING INSTRUMENT.

942,473.　　　　Specification of Letters Patent.　　Patented Dec. 7, 1909.

Application filed April 23, 1909. Serial No. 491,683.

*To all whom it may concern:*

Be it known that I, JAMES F. THAYER, a citizen of the United States, residing at Providence, in the county of Providence and State of Rhode Island, have invented certain new and useful Improvements in Button-Setting Instruments, of which the following is a specification.

This invention relates to hand-instruments employed for attaching the well-known type of "Heaton", or three-pronged metallic button-fasteners to shoes, &c., and it consists in the novel features of construction hereinafter set forth and claimed.

In instruments of the character referred to the two movable main members thereof are usually halved together at the pivot or joint portions and connected by means of a central screw or rivet mounted transversely therein.
As thus constructed the jaw and handle portions of each main member are substantially uniform in thickness throughout its length, except that at the joint portion the stock is milled off or counterbored through one-half of the thickness to receive the correspondingly milled fellow member; the two members when pivoted together having their outer faces flush with each other on the two respective sides of the implement. As thus formerly devised the instrument, usually made of malleable cast iron and surface hardened, is materially weakened by the cutting away of the stock contiguous to the joint, because the machining operation removes the corresponding surface or "skin" which is the stronger part of the metal; consequently the handles are liable to, and in fact do, break at the counterbored part of the joint when in use.

The objects I have in view are to simplify and strengthen the instrument, while at the same time reducing its weight and cost of manufacture. To these ends the two main members of the instrument are not counterbored and halved together at the joint but have the adjacent faces simply "surfaced" off true and flat; each member having its handle and jaw portions extend longitudinally in opposite directions from said joint part and gradually increasing in thickness, the maximum thickness being the same or substantially the same as analogous instruments of this character.

One of the members of my improved but-
ton-setting instrument has a comparatively large cylindrical shaped female centered true pin or stud formed integral with and projecting at right angles from the center of the corresponding face of the joint, the other member being bored to receive said pin without play. In assembling the members the pin is passed through the central hole of the other member thus bringing the two faces of the joint together, a washer is then placed on the portion of the pin extending through the hole and the free end riveted or swaged over by suitable tools so as to bear against the washer, thereby securing the members together under a suitable degree of friction between the joint's faces. This latter operation being facilitated by the presence of the female or concave center formed in the pin.

In the accompanying drawing, which clearly illustrates my improved button-setting instrument, Figure 1 represents a front side elevation thereof, the jaws being shown normally closed. Fig. 2 is a corresponding top plan view. Fig. 3 is a corresponding inverted or bottom plan view. Figs. 4 and 5 represent in plan view the respective front and rear members before being connected together. Fig. 6 is a transverse section, in enlarged scale, taken on line 6 6 of Fig. 1, and Fig. 7 is a front view showing a button and fastener held in the jaws of the instrument preparatory to attaching them to a shoe or fabric.

The following is a more detailed description: In my improved button-setting instrument the two handle members proper, $a^1$, $b^1$, are offset laterally in opposite directions from the center or pivot point and have the adjacent faces $c$ of the members at said point suitably machined off true and flat and in engagement with each other, as shown in Figs. 2 to 6, inclusive. The arrangement of the parts is such that a straight line drawn through the center of the two handles longitudinally will pass through the faces $c$ of the joint, the latter being in a vertical plane.

The portion of the handle $b^1$ beyond the pivot (toward the left as drawn) forms the button-and-fastener holding jaw $b$, or upper jaw, and the corresponding portion of the handle $a^1$ forms the anvil or clenching die $a$, or lower jaw. In the bottom portion of the said upper jaw is formed a vertical transversely extending groove $b^2$ and a recess $b^3$ communicating therewith adapted to receive the eye-shank of a button $r$ and a fastening $g$, substantially as usual. The upper face of the anvil is provided with two parallel transversely arranged concave grooves $a^2$ disposed with respect to the said recess $b^3$. I prefer to make the top area or working surface of the die portion of the anvil considerably smaller than the corresponding part of the upper or fellow member $b$, whereby the lower jaw is adapted to be inserted into the shoe with greater facility while at the same time the leather or flexible material to which the button is to be attached adjusts itself more readily to the jaw's face.

In order that the combined button and fastener may be snugly yet yieldingly retained in position in the jaw $b$ of the front member I employ a bent flat spring $s$ secured to the rear top part of the jaw by a small screw. By bending one or both edges of the spring downward around the corresponding corner of the jaw, as shown at $s^1$, the spring is positively maintained in position sidewise. When in use the front end of the spring is depressed and bears against the underside of the button, as shown in Fig. 7. In springs heretofore used for this purpose the free end portion thereof has been grooved so as to receive the eye-shank of the button; in the drawing it will be observed that the spring is not grooved or slotted but is adapted to extend to or nearly to the eye-shank of the button while at the same time being in engagement with the underside of the button's head. As thus devised the action of the free end portion of the spring, when in engagement with the button head, has a tendency to position the connected button and fastener in the said groove $b^2$ of the upper jaw and also at the same time to snugly press the opposite vertical side of the eye-shank against the outer edge of the groove, thereby preventing accidental lateral movement of the parts. This is a material advantage over springs of this general character having forked or slotted ends. One of the said jaw-carrying handle members (the rear one $a$ as drawn) is provided with an integrally formed laterally extending stud or pin $f$ located at the center of the corresponding joint face. The stud is one with the member $a\ a^1$ and has the fellow member $b\ b^1$ mounted to swing thereon. The stud is turned off true and cylindrical, its outer end being centrally recessed or cup-shaped, see $h$, thus forming a circular outer rim. See Fig. 4. After the front member has been mounted on the stud a washer $w$ is placed on its projecting end followed by swaging or rolling the rim over to form a retaining head or shoulder $p$ for maintaining the front member in position sidewise.

By means of the construction of the joint and pivot just described the implement is rendered stronger and stiffer and the jaws may be actuated with greater accuracy and with less power or friction, from the fact that the stud is rigid and solid with the jaw member itself and stands at exactly right angles or square with the joint-face $c$.

I claim as my invention:—

1. The combination in a button-setting instrument, of a pair of oppositely disposed handle members pivoted together, forwardly extending upper and lower jaw members integral with the said handle part arranged respectively for temporarily holding a connected button and a pronged fastener and for bending the prongs of the latter when the jaws are forced toward each other, a sheet-metal spring member secured to said upper jaw having its free or outer end portion constructed to bear against the underside of a button and extend to or nearly to the adjacent vertical side of its shank or eye and not project therebeyond, substantially as shown and described.

2. The combination in a button-setting instrument, of a pair of oppositely disposed jaw-carrying handle members pivoted together and constructed substantially as described, one of the members at said pivot point having a pintle integral therewith and passing transversely through the other handle member and terminating in a cup-shaped end, and a washer positioned upon the pin and bearing against the face of the front handle member and held in place by bending the rim of the cupped part of the pintle both rearwardly and outwardly.

In testimony whereof I have affixed my signature, in presence of two witnesses.

JAMES F. THAYER.

Witnesses:
 GEO. H. REMINGTON,
 FRANKLIN A. SMITH.